Patented Jan. 9, 1945

2,366,857

UNITED STATES PATENT OFFICE 2,366,857

LEAVENING COMPOSITION

Rudolph J. Hurka, Clearwater, Fla., assignor to Monsanto Chemical Company, a corporation of Delaware No Drawing. Application July 18, 1942,
Serial No. 451,499

20 Claims. (Cl. 99—95)

This invention relates to improved chemical leavening agents of the calcium pyrophosphate type.

The invention herein disclosed and claimed is an improvement particularly upon the invention disclosed and claimed in the application of Charles F. Booth, Serial No. 335,840, filed May 17, 1940. It may however be applied to other calcium acid pyrophosphate containing compositions.

The process disclosed in the Booth application consists in the reaction together of phosphoric acid and a lime base such as quick lime under conditions so that a temperature substantially above 140° C. and preferably above 180° C., but below 300° C., is attained in the reacting mass. The product obtained by the Booth process comprises crystallized calcium acid pyrophosphate, $CaH_2P_2O_7$, together with monocalcium orthophosphate, the calcium acid pyrophosphate comprising upwards of 20% of the mixture. According to the Booth process calcium acid pyrophosphate leavening compositions may be prepared by variations in the procedure therein described and products produced thereby which contain upwardly of 20% crystallized calcium acid pyrophosphate and specifically from 50% through 60% upwards to 90% of this compound.

Since the Booth product is produced by a process wherein simultaneous crystallization of both calcium acid pyrophosphate and monocalcium orthophosphate takes place, the product is presumably an inter-crystalline association of these two compounds and it is believed that the relatively high leavening activity of this mixture of compounds is due to the fact that either the calcium acid pyrophosphate is activated by the monocalcium orthophosphate or that the product by virtue of its process of manufacture contains "activating" water in a minor amount, that is, water not chemically bound as water of hydration.

The compound, calcium acid pyrophosphate, $CaH_2P_2O_7$, may also be prepared by heating either the hydrated or anhydrous monocalcium orthophosphate, $CaH_4(PO_4)_2$, to temperatures at which molecularly combined water is liberated. By variations in the degree and method of heating products may be obtained which contain varying amounts of the acid pyrophosphate and orthophosphate, or which comprise particles or crystals of monocalcium orthophosphate carrying a coating of calcium acid pyrophosphate. Various rates of reaction may be obtained by mechanically mixing either thermally produced or crystallized calcium acid pyrophosphate together with monocalcium orthophosphate of either the hydrated or anhydrous variety. The anhydrous variety of monocalcium orthophosphate may for this purpose be produced in either the solid crystalline or in the porous condition.

A method of evaluating chemical leavening agents of the herein described type is described in the Journal of Cereal Chemistry, vol. 8 at page 423, 1931. This method has been adopted as a Standard biscuit baking test by the American Association of Cereal Chemists. In the procedure as adopted by this association, in order to eliminate uncontrollable variables, it is customary to employ water as the liquid when preparing the biscuit dough. When preparing biscuit doughs using the leavening agent prepared by any of the aforesaid methods and employing water as the liquid, as called for by the Standard baking procedure, satisfactory biscuits are obtained. However, when employing milk as the liquid for making the dough, certain adverse effects are encountered which, it is believed, are caused by the effect of calcium acid pyrophosphate or ions formed therefrom upon the milk or constituents thereof such as proteins. Such adverse effect is recognized by the so-called "short" doughs, the elasticity of which has been seriously reduced.

In investigating the effect of this adverse result when employing milk as the liquid in biscuit manufacture, I have discovered that the adverse effect is more pronounced when chemically bleached flours are employed than when unbleached flours are used.

The adverse effect of the calcium acid pyrophosphate leavening in the presence of milk, upon biscuits may be measured by the standard biscuit baking technique and is illustrated in Table I below, which gives data taken from actual biscuits which have been baked utilizing a calcium acid pyrophosphate leavening with the three fluids, water, reconstituted dried skim milk, and fresh milk.

Table I

| | | pH | Wt. dough | Actual volume | Specific volume |
|---|---|---|---|---|---|
| 1 | C. A. P. P.+H₂O | 7.03 | 25.8 | 65.8 | 18.93 |
| 2 | C. A. P. P.+dried skim milk | 6.87 | 23.8 | 55.0 | 17.40 |
| 3 | C. A. P. P.+fresh milk | 6.94 | 24.3 | 57.8 | 17.72 |

As will be noted from the table, the effect of the calcium acid pyrophosphate, designated as C. A. P. P. in the table, when employing milk is manifested by a slightly lower pH and a lower specific volume of the biscuit. This effect is encountered both with the dried skim milk and with fresh milk and presumably is due to a protein-pyrophosphate reaction. The table above described the results obtained upon "immediate" bakings, that is, where there is no delay prior to rolling and cutting of the biscuits. The effect is moreover also noticeable and is somewhat more pronounced where there is a delay in the rolling and cutting of the biscuits.

I have now found that by the addition to the calcium acid pyrophosphate leavening agent of a glassy soluble alkali metal metaphosphate, more particularly the glassy sodium hexa metaphosphate, commonly known as Graham's salt, the adverse effect pointed out above can be substantially overcome. For the purpose of realizing the improved results it is necessary only that the sodium hexa metaphosphate be present during the leavening reaction, that is, at the time when the liquid is added to the dry constituents to form the dough. For this purpose I may accordingly prepare a mixture of the calcium acid pyrophosphate and the sodium hexa metaphosphate by preparing both salts in the finely divided or powdery state and then thoroughly mixing the two salts together. It is also practical to dissolve the sodium hexa metaphosphate or other soluble metaphosphate in the liquid, that is, in the water or in the milk which is employed for the biscuit dough. For the preparation of baking powders where all constituents are thoroughly mixed together in the form of a more or less fine powder, I prefer to powder the Graham's salt to at least the same fineness as the other constituents of the baking powder and mix it thoroughly therein. For the preparation of self-rising flours I prefer to first produce a mixture of phosphates, that is, the calcium acid pyrophosphate, as it is disclosed in the Booth application, and mix therewith the sodium hexa metaphosphate or Graham's salt generally in the proportions of 6 parts by weight of the calcium acid pyrophosphate to 1 part of the soluble sodium hexa metaphosphate. These proportions may be somewhat varied, and in general I have found that usually from 1 part of the soluble metaphosphate to as much as 10 to 12 parts, or to as little as 3 to 4 parts of calcium acid pyrophosphate may be used. For the preparation of self-rising flours the crystallized calcium acid pyrophosphate-sodium metaphosphate mixture is incorporated into the flour in the usual proportions, that is, per 1,000 parts of flour I employ 15 to 20 parts of phosphate, together with sufficient sodium bicarbonate to produce with the phosphate mixture a substantially neutral biscuit.

In place of sodium hexa metaphosphate I may employ a mixture of sodium and potassium metaphosphate. Such a mixture is preferably made in the proportions of, say, 80% to 90% of $NaPO_3$ equivalent to 20% to 10% of $KPO_3$ equivalent. The amount of potassium in the mixed metaphosphate is restricted to the amount necessary to decrease the hygroscopicity of the metaphosphate mixture. Such compositions may be readily prepared by fusion utilizing the equivalent proportions of the corresponding orthophosphate salts.

Baked products using my improved leavening composition have a somewhat improved taste, that is, the calcium acid pyrophosphate taste has been substantially eliminated, the color of the baked product is somewhat better and the biscuit is considerably lighter.

Illustrating the effect of my composition upon baked products, the results in Table II, were obtained utilizing the standard biscuit baking procedure, and employing a 4 minute delay between mixing and rolling the dough, in order to accentuate the effect.

Table II

| | | Liquid | Wt. dough | Actual volume | Specific volume |
|---|---|---|---|---|---|
| 1 | C. A. P. P. | $H_2O$ | 25.1 | 57.5 | 17.0 |
| 2 | C. A. P. P.+0.5% "A" | $H_2O$ | 23.8 | 59.4 | 18.5 |
| 3 | C. A. P. P. | Milk | 22.4 | 47.3 | 15.7 |
| 4 | C. A. P. P.+0.5% "A" | do | 23.1 | 58.8 | 18.8 |
| 5 | C. A. P. P.+0.5% "B" | $H_2O$ | 24.8 | 65.0 | 19.3 |
| 6 | C. A. P. P.+0.5% "B" | Milk | 24.0 | 63.8 | 19.5 |

"A"=sodium hexa metaphosphate, Graham's salt.
"B"=mixture consisting of 80% $NaPO_3$+20% $KPO_3$ which has been fused and quickly cooled.

From the above table it will be noted that biscuits baked with doughs leavened with calcium acid pyrophosphate and containing sodium hexa metaphosphate or a potassium metaphosphate containing mixture in amount equivalent to 0.5% based upon the dry ingredients of the dough, are substantially lighter than when such sodium metaphosphate is absent from the dough. It will also be noted that either milk or water may be used as the liquid for forming the dough without sacrifice of lightness of the biscuit or elasticity of the dough.

Tests made in a commercial bakery on so-called "high sugar ratio" white cakes showed that C. A. P. P. containing a minor proportion of the alkali metal metaphosphate produced cakes which possessed preferred characteristics shown in the following table:

Table III

| | C. A. P. P. | 86% C. A. P. P. 14% "C" |
|---|---|---|
| Symmetry | 14.3 | 16.0 |
| Actual volume cc | 672 | 692 |
| Specific volume cc./g | 3.23 | 3.26 |

"C"=mixture consisting of 90.5% $NaPO_3$+9.5% $KPO_3$.

The mixtures of calcium acid pyrophosphate and sodium metaphosphate herein disclosed are loose mixtures in the ordinary sense of the term. There is, in other words, no coating of the crystals or particles of the calcium pyrophosphate by means of the sodium metaphosphate or other metaphosphate employed. Where coatings have been employed in the past, particularly upon anhydrous monocalcium phosphate, such coatings have been described as alkali metal metaphosphates. However, due to the method of preparation of the prior art products these coatings are not the equivalent of the hexa metaphosphates or Graham's salt herein employed, primarily because the coating salts were insoluble, and consequently had no effect upon the proteins of milk in the presence of pyrophosphate.

What I claim is:

1. A leavening acid comprising calcium acid pyrophosphate and a minor proportion of an alkali metal hexa metaphosphate.

2. A leavening acid comprising calcium acid pyrophosphate and a minor proportion of sodium hexa metaphosphate.

3. A leavening acid comprising an intercrystalline mixture of calcium acid pyrophosphate, monocalcium orthophosphate and a minor proportion of glassy sodium metaphosphate.

4. A leavening acid comprising a mixture of calcium acid pyrophosphate and monocalcium orthophosphate, said mixture consisting of from 20% to 90% of calcium acid pyrophosphate and said acid containing a minor proportion of soluble glassy sodium metaphosphate.

5. The acid defined in claim 4 in which the acid contains from 5 to 12 parts of calcium acid pyrophosphate for each part of sodium metaphosphate.

6. The acid defined in claim 4 in which the sodium metaphosphate contains sufficient potassium salt to render the sodium metaphosphate substantially non-hygroscopic.

7. The leavening acid defined in claim 4 in which the sodium metaphosphate contains from 10% to 20% of potassium salt.

8. A leavening acid comprising monocalcium phosphate particles carrying a coating of calcium acid pyrophosphate, said acid including a minor proportion of glassy soluble sodium metaphosphate.

9. The acid defined by claim 4 in which the glassy soluble sodium metaphosphate contains a minor amount of potassium metaphosphate.

10. A leavening acid comprising calcium acid pyrophosphate, and a minor proportion of a soluble glassy metaphosphate, the basic constituent of said metaphosphate being an alkali oxide.

11. A leavening acid comprising a mixture of calcium acid pyrophosphate and monocalcium orthophosphate, said mixture consisting of from 20% to 90% of calcium acid pyrophosphate, said mixture also containing a soluble glassy metaphosphate, the basic constituent of said metaphosphate being an alkali oxide.

12. In a method of leavening in which sodium bicarbonate is reacted with calcium acid pyrophosphate in a liquid medium containing milk, the improvement which comprises carrying out said reaction in the presence of soluble glassy sodium metaphosphate.

13. The method defined in claim 12 in which the leavening reaction is carried out in the presence of dissolved sodium hexa metaphosphate.

14. A leavening composition comprising sodium bicarbonate, calcium acid pyrophosphate and a minor proportion of sodium hexa metaphosphate.

15. A leavening composition comprising sodium bicarbonate calcium acid pyrophosphate and a minor proportion of a glassy soluble alkali metal metaphosphate.

16. A leavening composition comprising sodium bicarbonate, calcium acid pyrophosphate and a minor proportion of an alkali metal hexa metaphosphate.

17. A baking preparation comprising flour, sodium bicarbonate, calcium acid pyrophosphate and a minor proportion of a soluble alkali metal metaphosphate.

18. A baking preparation comprising flour, sodium bicarbonate, calcium acid pyrophosphate and a minor proportion of a soluble glassy alkali metal metaphosphate.

19. A baking preparation comprising flour, sodium bicarbonate, calcium acid pyrophosphate and a minor proportion of sodium hexa metaphosphate.

20. In a method of leavening in which sodium bicarbonate is reacted with calcium acid pyrophosphate in a liquid medium containing milk, the improvement which comprises carrying out said reaction in the presence of an alkali metal hexa metaphosphate.

RUDOLPH J. HURKA.